(12) United States Patent
Werner et al.

(10) Patent No.: US 12,151,568 B2
(45) Date of Patent: Nov. 26, 2024

(54) DRIVE SYSTEM, AND MOTOR VEHICLE (71) Applicant: Schaeffler Technologies AG & Co. KG, Herzogenaurach (DE)

(72) Inventors: Olaf Werner, Bühl (DE); Georg Göppert, Hausach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 323 days.

(21) Appl. No.: 17/606,530

(22) PCT Filed: Apr. 9, 2020

(86) PCT No.: PCT/DE2020/100289
§ 371 (c)(1),
(2) Date: Oct. 26, 2021

(87) PCT Pub. No.: WO2020/221392
PCT Pub. Date: Nov. 5, 2020

(65) Prior Publication Data
US 2022/0203846 A1 Jun. 30, 2022

(30) Foreign Application Priority Data

May 2, 2019 (DE) .......................... 102019111301.6

(51) Int. Cl.
*B60L 50/71* (2019.01)
*B60L 50/72* (2019.01)
*H01M 8/00* (2016.01)
*H01M 8/12* (2016.01)
*H02K 7/00* (2006.01)

(52) U.S. Cl.
CPC ............... *B60L 50/71* (2019.02); *B60L 50/72* (2019.02); *H01M 8/004* (2013.01); *H02K 7/003* (2013.01); *H01M 2008/1293* (2013.01); *H01M 2250/20* (2013.01)

(58) Field of Classification Search
CPC .......... B60L 50/71; B60L 50/72; B60L 50/70; H01M 8/004; H01M 2008/1293; H01M 2250/20; H01M 8/086; H01M 8/1004; H01M 8/1011; H01M 8/145; H01M 2008/147; H01M 8/0612; H01M 8/083; H01M 2300/0014; H01M 8/2457; H02K 7/003; H02K 7/116; H02K 17/12;
(Continued)

(56) References Cited

U.S. PATENT DOCUMENTS 5,678,647 A 10/1997 Wolfe et al.
6,005,322 A 12/1999 Isaak et al.
(Continued)

FOREIGN PATENT DOCUMENTS

DE 2534511 C3 11/1978
DE 19916243 A1 10/2000
(Continued)

*Primary Examiner* — Christopher M Koehler
*Assistant Examiner* — Riley Owen Stout
(74) *Attorney, Agent, or Firm* — Volpe Koenig (57) ABSTRACT

A drive system (1) having a unipolar machine (2) and a fuel cell (3) for supplying the unipolar machine (2) with electrical energy. The fuel cell (3) can be arranged in a ring shape around a rotor shaft (5) of a rotor (4) of the unipolar machine (2). The unipolar machine (2) can be provided in a motor vehicle (600) to supply a traction torque.

13 Claims, 6 Drawing Sheets

(58) Field of Classification Search
CPC .... H02K 21/20; H02K 11/0094; H02K 17/14; Y02T 90/40; Y02T 10/64
See application file for complete search history.

(56) References Cited

U.S. PATENT DOCUMENTS

| | | | |
|---|---|---|---|
| 9,112,197 B1* | 8/2015 | Kashyap | H01M 8/0247 |
| 9,302,723 B1 | 4/2016 | Pollitzer et al. | |
| 2001/0051290 A1* | 12/2001 | Kashiwagi | H01M 8/04738 |
| | | | 429/9 |
| 2021/0152105 A1* | 5/2021 | Froelich | B60K 17/34 |

FOREIGN PATENT DOCUMENTS

| | | |
|---|---|---|
| DE | 10063230 A1 | 7/2001 |
| DE | 10164435 A1 | 8/2003 |
| EP | 1043792 | 10/2000 |
| GB | 413026 A | 7/1934 |
| JP | S4824696 U | 3/1973 |
| RU | 2062335 C1 | 6/1996 |

* cited by examiner

DRIVE SYSTEM, AND MOTOR VEHICLE

CROSS-REFERENCE TO RELATED APPLICATIONS

This application is the U.S. National Phase of PCT Appln. No. PCT/DE2020/100289, filed Apr. 9, 2020, which claims priority to DE 102019111301.6, filed May 2, 2019, the entire disclosures of which are incorporated by reference herein.

TECHNICAL FIELD

The disclosure relates to a drive system with a fuel cell and a motor vehicle equipped with such a drive system.

BACKGROUND

Electric machines are used in wide areas of technology, increasingly also in the automotive sector as electric motors for driving motor vehicles. The electrical energy for electric motors can be provided in various ways, in the area of mobility, for example, via accumulators or fuel cells that are carried on the vehicle, in the latter case in conjunction with an adequate fuel supply. Fuel cells and their electrochemical mode of operation are well known in different variants. The basic principle of a fuel cell is to supply hydrogen to one electrode of the fuel cell and oxygen to the other electrode. The hydrogen molecules are split at the electrode and give up electrons to the electrode, which flow over a conductor to the other electrode to form oxygen ions together in combination with the oxygen. Ultimately, water is produced and a current flows in the conductor between the electrodes. Oxygen and hydrogen can be stored in pure form and fed to the fuel cell. However, it is also possible to use oxygen from the ambient air. Hydrogen can be obtained from compounds such as methane or ammonia by reforming; the respective compound is split electrolytically during the process. Unless pure oxygen and pure hydrogen are used, by-products are created that have to be removed from the fuel cell and disposed of.

Electric motors, especially in the automotive sector, are operated in the high-voltage range. Since individual fuel cells only supply voltages in the range of approx. 1 volt, several cells (easily a few hundred) are connected in series. In the case of accumulators, several accumulator cells, the output voltage of which is determined by the electrochemistry used in them, are usually connected in series as well in order to obtain the desired operating voltage for the electric motor.

The electric motors used (such as permanently excited synchronous machines or reluctance machines) often require power electronics to control the power supply. In particular, currents in the electric machine often have to be switched as a function of an angular position of a rotor of the electric machine, for which purpose the angular position of the rotor can be determined via angle sensors (e.g., resolvers). The switching processes mentioned lead to irregularities in the torque of the electric machine and in the radial and axial forces of the electric machine. This is often undesirable and can lead to so-called noise-vibration-harshness problems (NVH problems) in the automotive sector. Furthermore, such electric machines often show weak start-ups.

SUMMARY

The object of the disclosure is therefore to specify a drive system that does not require high-voltage technology and in which irregularities in the drive torque and in the radial and axial forces are avoided. In addition, a corresponding motor vehicle shall be specified.

The object with regard to the drive system is achieved by a drive system having one or more of the features described herein. The object with regard to the motor vehicle is achieved by a motor vehicle having one or more of the features described herein. The description and claims that follow contain advantageous further developments.

The drive system according to the disclosure uses a unipolar machine as the electric motor. A unipolar machine as such is known: A rotor in the form of a disk is permeated by a magnetic field perpendicularly to the disk or at least by a magnetic field component perpendicularly to the disk. Electric current is conducted between the center of the disk and the edge of the disk. Due to the magnetic field, a Lorentz force on the moving charge carriers results, which leads to a torque on the disk. The torque can be removed via a rotor shaft connected to the disk; the rotor shaft can also be used as a conductor for making electrical contact with the center of the disk. The rotor shaft and disk can each be electrically contacted, for example, via a brush, the disk preferably being contacted by the brush at its outer edge.

In principle, a unipolar machine does not require any commutation or any other switching of currents in the machine and can therefore run without irregularities in the torque. A unipolar machine also is no problems when starting up. Since the generated torque depends on the current intensity, high currents are required for high torques; if the electrical resistance of the rotor is low, however, these can be achieved at low voltages. What is needed therefore is a power source that is able to deliver high currents without the need for high voltages.

According to the disclosure, a fuel cell is used for this purpose. A sufficiently large electrode area is required for the fuel cell in order to be able to convert a sufficient amount of hydrogen and oxygen per unit of time in order to be able to provide the amount of charge required for the desired current intensity per unit of time. A plurality of fuel cells can also be connected in parallel, with the electrodes of the individual fuel cells connected in parallel then forming an electrode for the purposes of this application. The fuel cell is part of the drive system and can be integrated into the unipolar machine itself, in which case one can speak of an in-situ fuel cell (ISB). A series connection of several fuel cells to increase the available voltage is usually unnecessary.

In one embodiment, the fuel cell surrounds the rotor shaft of the unipolar machine in an annular manner. The fuel cell can in particular also enclose the rotor, that is to say the disk, of the unipolar machine in a ring shape. The rotor shaft, rotor and the ring-shaped fuel cell can be arranged concentrically to one another. A fuel cell which surrounds the rotor shaft in a ring shape, in particular the rotor itself, offers a large area for the electrodes of the fuel cell, which, as explained above, is required for high currents.

In a further development, an electrode of the fuel cell that surrounds the rotor shaft in a ring shape is connected to the rotor in a non-rotatable manner. This means in particular that the electrode rotates with the rotor when the unipolar machine is in operation. This further development is possible if the fuel cell uses a liquid electrolyte ("wet fuel cell"). In this development, the electrolyte can also take on the function of a brush, more precisely the brush that makes electrical contact with the edge of the disk of the unipolar machine. In this development, fuel can be supplied to the electrode connected to the rotor in a non-rotatable manner via a rotary feedthrough and a channel. The channel runs through the rotor shaft and disk, and the rotary feedthrough provides for the delivery of fuel from a supply into the channel. A liquid electrolyte can also be used for cooling. Specifically, in this development, the fuel cell may surround the rotor in a ring shape and the electrode connected for conjoint rotation to the rotor can be connected to the rotor on the outer edge of the rotor.

In another development, a brush is provided to electrically connect the rotor of the unipolar machine, preferably on the outer edge of the disk, to an electrode of the fuel cell, and a further brush is provided to connect the rotor shaft to another electrode of the fuel cell in an electrically conductive manner. In this case, the fuel cell may surround the rotor shaft in a ring shape, and also the rotor, without an electrode of the fuel cell rotating with the rotor during operation of the unipolar machine.

In another embodiment, a reformer is integrated into the drive system. The drive system with unipolar machine, fuel cell and reformer can then be regarded as a drive module to which the fuel (for example, but not limited to, ammonia or methane) can be supplied. Hydrogen is generated from the fuel in the reformer.

The magnetic field that permeates the disk of the unipolar machine is generated by at least one magnet that is part of the unipolar machine. In one embodiment, the at least one magnet is an electromagnet. The electromagnet can for example be supplied with current by a generator, wherein the generator can be driven by the unipolar machine. However, it is also conceivable that a permanent magnet is used as the magnet of the unipolar machine in another embodiment.

It should generally be noted that the unipolar machine can be controlled via the fuel supply to the fuel cell. In order to enable precise control with short reaction times, the fuel cell must be highly dynamic. If possible, the fuel cell should be operated without excess in order to avoid overrun when the load changes. Supplied hydrogen or oxygen should quickly and evenly be distributed over the electrode surfaces without accumulations of hydrogen or oxygen forming in areas of the fuel cell which, after interruption or reduction of the fuel supply, act on the electrodes to the desired extent. Furthermore, the behavior of the unipolar machine, as long as its magnet is an electromagnet, can be influenced by interventions on the coil, for example when the load is spontaneously removed. The direction of travel of the unipolar machine can be changed by reversing the direction of the magnetic field, i.e., by changing the direction of the current in the windings of the electromagnet.

Hydrogen for the fuel cell can, for example, either be present in pure form in a pressure vessel, as a composite (e.g., ammonia, methane, methanol), or bound in solids or liquids. Oxygen can, for example, be stored in pure form or taken from the air.

Different types of fuel cells can be used. For example, fuel cells with alkaline electrolytes, such as a potassium hydroxide solution. Further non-limiting examples are membrane fuel cells, direct methanol fuel cells, phosphoric acid fuel cells, molten carbonate fuel cells or solid oxide fuel cells.

The motor vehicle according to the disclosure has a drive system as described above, with a unipolar machine and a fuel cell. The unipolar machine is intended to provide a traction torque for the motor vehicle.

In one embodiment, the unipolar machine drives a further electric machine. This can be a generator to supply a low-voltage electrical system of the motor vehicle. A generator driven by the unipolar machine can also supply an electromagnet of the unipolar machine with power or a reformer for the fuel in the fuel cell.

In one embodiment, the motor vehicle has at least two drive systems as described above and each of the drive systems is provided for driving a wheel or a group of wheels of the motor vehicle.

BRIEF DESCRIPTION OF THE DRAWINGS

The disclosure and the advantages thereof are explained in more detail below with reference to the accompanying schematic drawings.

DETAILED DESCRIPTION

The drawings merely represent exemplary embodiments of the disclosure and are therefore not to be construed as limiting the disclosure to the exemplary embodiments shown.

Figure 1:
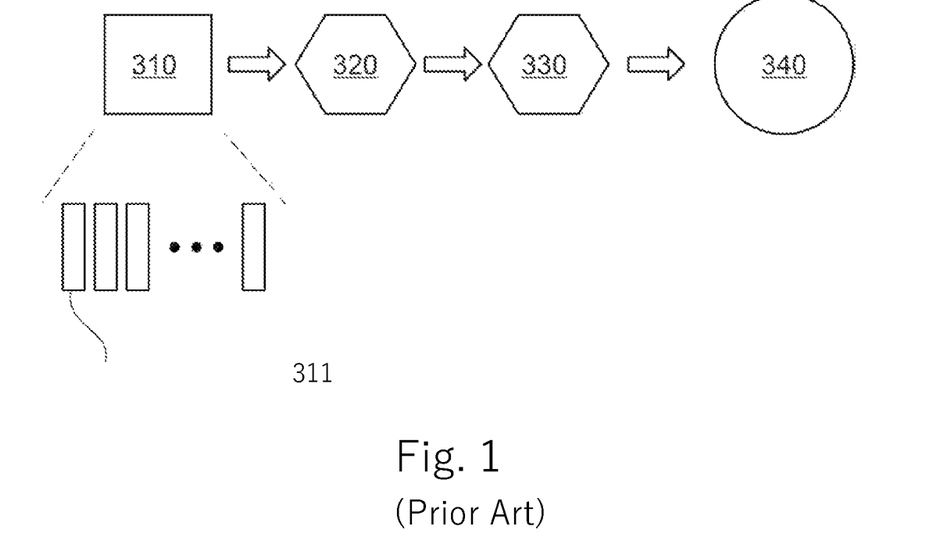
FIG. 1 is the basic concept of a conventional drive system.

FIG. 1 is the basic concept of a conventional drive system. An electric motor 340 (for example a permanently excited synchronous machine) is supplied with electrical energy by a fuel cell 310. This is handled via an energy storage device 320 and power electronics 330, which control the currents in the electric motor, for example ensuring commutation. The fuel cell 310 is composed of a plurality of fuel cell elements 311 connected in series. Each fuel cell element 311 is itself a fuel cell. The voltages of the individual fuel cell elements 311 add up due to the series connection, so that the fuel cell 310 can provide the voltage required to operate the electric motor 340.

Figure 2:
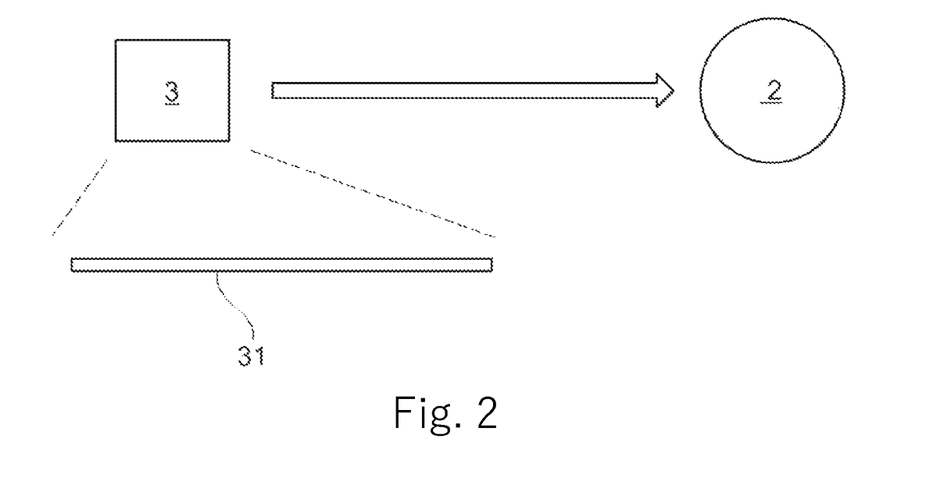
FIG. 2 is the basic concept of the drive system according to the disclosure.

FIG. 2 is the basic concept of a drive system according to the disclosure. A unipolar machine 2 is supplied with electricity directly from a fuel cell 3. An electrode 31 of the fuel cell 3 is shown symbolically in order to illustrate that the fuel cell 3 has electrodes 31 with a large area compared to the embodiment in FIG. 1, in order to provide a high current intensity for the unipolar machine 2. In contrast to the concept shown in FIG. 1, high voltage is not required.

Figure 3:
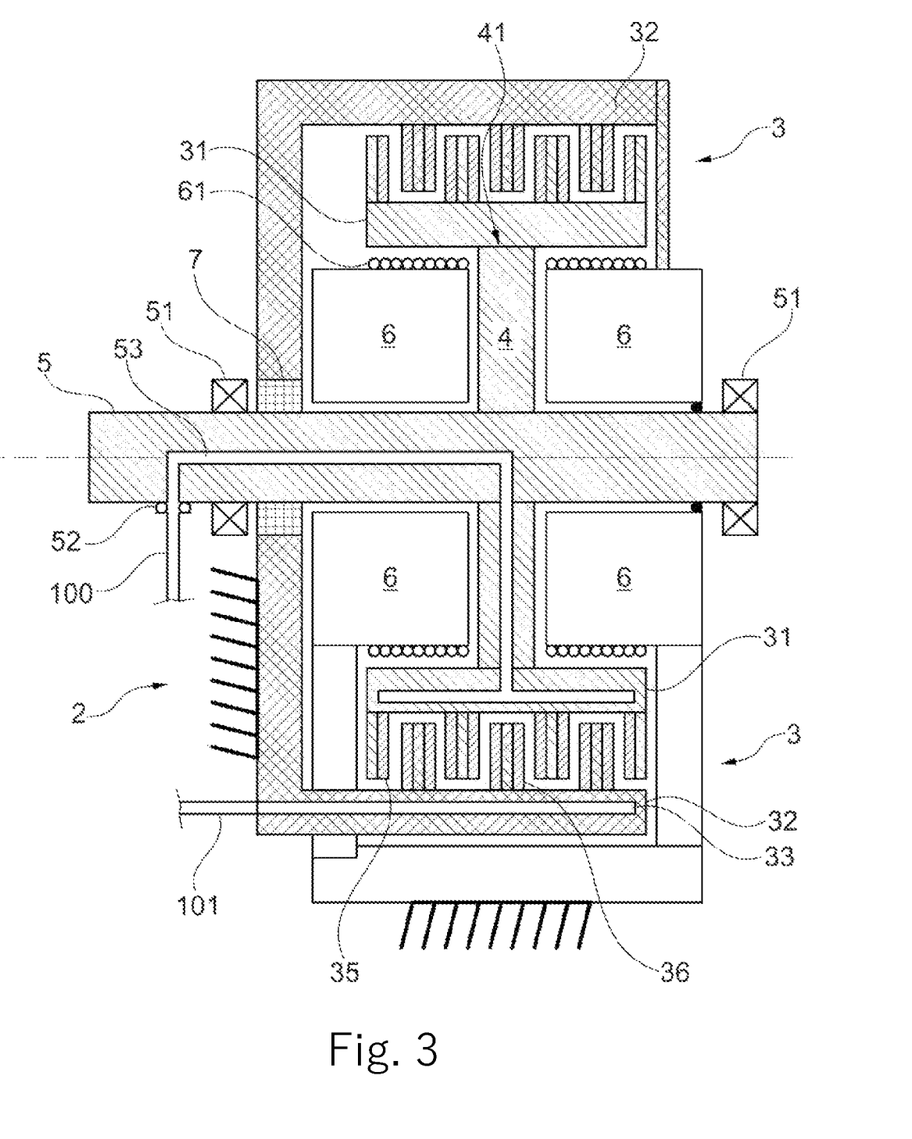
FIG. 3 is an embodiment of a device according to the disclosure.

FIG. 3 is an embodiment of a drive system 1 according to the disclosure, with a unipolar machine 2 and a fuel cell 3. The unipolar machine 2 has a rotor 4 and a rotor shaft 5 as well as a magnet 6, which in this embodiment is an electromagnet; windings 61 of the electromagnet are shown. The rotor shaft 5 is mounted in an installation environment of the drive system 1 by means of bearings 51. The fuel cell 3 surrounds the rotor shaft 5 and rotor 4 in an annular manner. An electrode 31 of the fuel cell 3 is connected to the rotor 4 in a non-rotatable manner at an outer edge 41 of the rotor 4. When the unipolar machine 2 is in operation, this electrode 31 rotates with the rotor 4 relative to a further electrode 32 of the fuel cell 3; the further electrode 32 is at rest relative to the installation environment of the drive system 1. The non-rotatable connection between the rotor 4 and the electrode 31 also provides an electrically conductive connection between the outer edge 41 of the rotor 4 and the electrode 31. An electrically conductive connection between the electrode 32 and the rotor shaft 5 is established by the brush 7.

In the embodiment shown here, a liquid electrolyte, for example potassium hydroxide, is used in the fuel cell 3. Via a fuel feed line 100, hydrogen can reach the channel 53 (only shown on one side of the rotor) in the rotor shaft 5 and rotor 4 through a rotary feedthrough 52 and from there the electrode 31. Oxygen can flow into the channel 33 and from there into the electrode 32 via the fuel supply 101. On the electrodes 31 and 32, respectively, in contact with the electrolyte, areas 35 and 36 are provided, where the splitting of oxygen and hydrogen takes place. These areas 35 and 36 can have, for example, platinized carbon nanotubes in order to offer a large surface for the reaction catalyzed by platinum. The channels 53 and 33 branch off to the areas 35 and 36, respectively, in order to ensure the supply of hydrogen and oxygen to the areas 35 and 36, respectively.

It would also be conceivable to feed oxygen into fuel cell 3 via fuel supply 100 and hydrogen via fuel supply 101.

Figure 4:
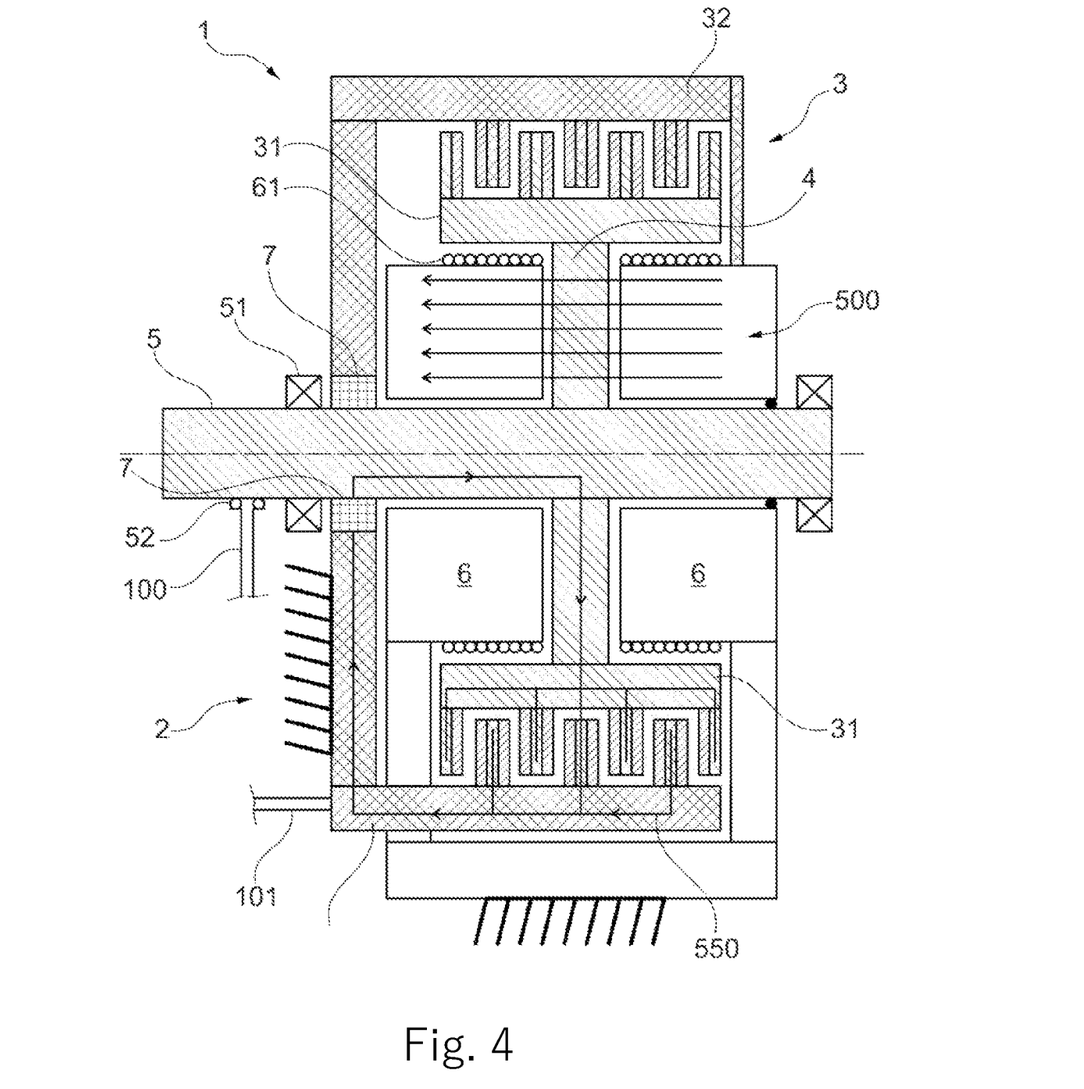
FIG. 4 illustrates the course of the current and the magnetic field in the embodiment from FIG. 3.

FIG. 4 again shows the embodiment shown in FIG. 3. In the interests of clarity, some reference symbols and hatching have been omitted here compared with FIG. 3. Channels 33 and 53 are also not shown. The magnetic field 500, which is generated by the magnet 6, in the area of the rotor 4 is shown by arrows. The magnetic field 500 is only shown for part of the rotor 4, but in the area of the rotor 4 the magnetic field is rotationally symmetrical about the rotor shaft 5. A current profile 550 is also shown, from electrode 32 via brush 7, rotor shaft 5 and rotor 4 to electrode 31.

Figure 5:
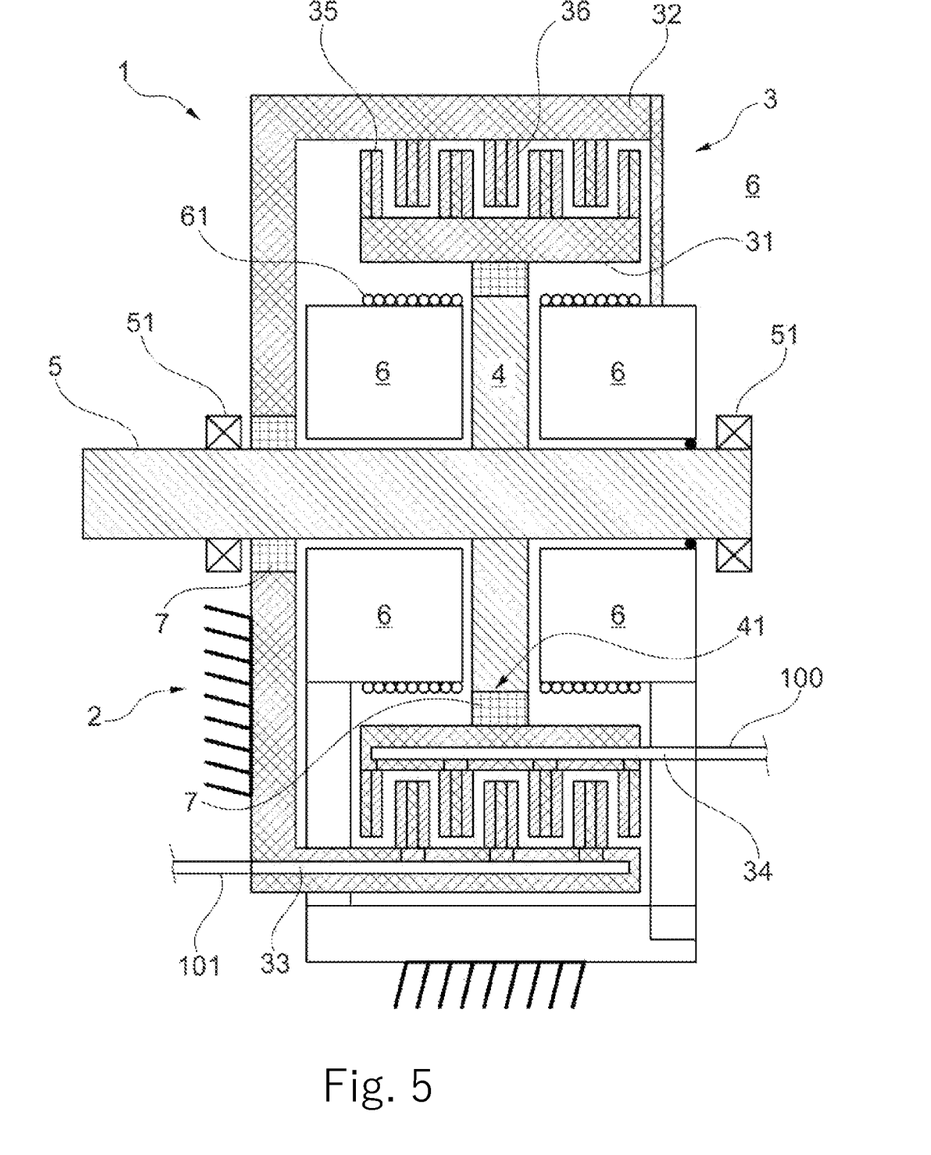
FIG. 5 is a further sectional view of a master cylinder according to the disclosure.

FIG. 5 is a further embodiment of a drive system 1 according to the disclosure with a unipolar machine 2 and a fuel cell 3. Many of the elements shown are analogous to the embodiment from FIG. 3, so that the corresponding explanations are not repeated. In the exemplary embodiment in FIG. 5, too, the fuel cell 3 surrounds the rotor shaft 5 and rotor 4 in an annular manner. In contrast to the embodiment from FIG. 3, however, the electrode 31 is not connected to the rotor 4 in a non-rotatable manner. Rather, when the unipolar machine 2 is in operation, both the electrode 31 and the electrode 32 are at rest relative to an installation environment of the drive system 1. An electrical contact between the rotor 4 and the electrode 31 is established on the outer edge 41 of the rotor 4 via a brush 7. An electrical contact between rotor shaft 5 and electrode 32 is established via a further brush 7. Hydrogen can reach channel 34 in electrode 31 via fuel supply 100. Oxygen can reach channel 33 in electrode 32 via fuel supply 101. It would also be possible to supply oxygen via fuel supply 100 and hydrogen via fuel supply 101. In this embodiment too, the channels 33 and 34 branch off in order to guide hydrogen and oxygen to the regions 35 and 36, respectively.

Figure 6:
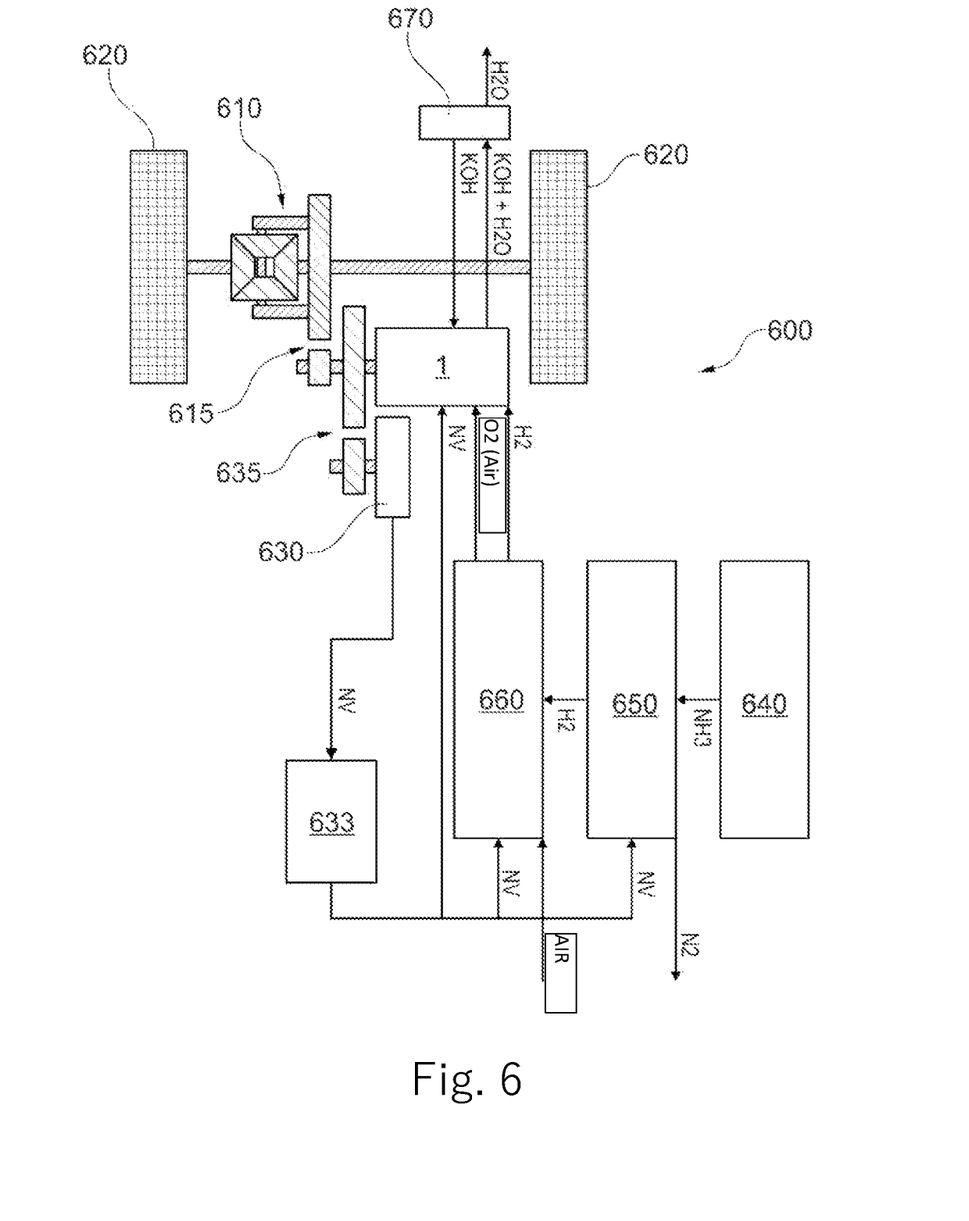
FIG. 6 is one possibility of using the drive system according to the disclosure in a motor vehicle.

FIG. 6 is an example of the integration of the drive system 1 according to the disclosure into an overall system, in this case a motor vehicle 600, which is only shown schematically. The drive system 1 is used in the motor vehicle 600 as a traction machine and, via a transmission 615, drives a differential 610, which transmits torque to the wheels 620. Furthermore, the drive system 1 drives an electric machine 630 via a transmission 635, which can act as a low-voltage generator and feeds a low-voltage electrical system via a battery 633. In particular, the electromagnet 6 of the unipolar machine 2 of the drive system 1 can be supplied by the battery 633. The electric machine 630 can also be used for recuperation and for driving when the motor vehicle 600 is maneuvering.

In this exemplary embodiment, ammonia is carried as a fuel supply in a pressure accumulator 640 at a pressure of approximately 9 bar. From there, the ammonia goes to a reformer 650, which splits the ammonia into hydrogen and nitrogen. The nitrogen is released into the environment, and the hydrogen ultimately reaches the drive system 1 via a control system 660. The reformer 650 and the control system 660 are supplied with low voltage (LV) from the battery 633. The control system 660 includes valves (not shown) to control the supply of hydrogen and oxygen to the drive system 1. The oxygen can be supplied to the drive system 1 as part of the ambient air, for which purpose the control system 660 can comprise a compressor (not shown). Electrolyte, in this case a potassium hydroxide solution, is discharged from the drive system 1, more precisely from the fuel cell 3 of the drive system 1, to an assembly 670, where reaction products of the reaction taking place in the fuel cell 3 are removed from the electrolyte. The main reaction product is water; this is partially removed from the electrolyte solution so that a more concentrated potassium hydroxide solution can be returned to the fuel cell 3. The electrolyte solution is also cooled in the assembly 670. Instead of obtaining the hydrogen from, for example, ammonia in a reformer 650, a hydrogen supply can also be carried along in the motor vehicle 600.

FIGS. 7A-7E schematically show further possible uses of the drive system 1 according to the disclosure in a motor vehicle, whereby the list of the examples shown raises no claim to completeness. Further application scenarios are conceivable.

Figure 7:
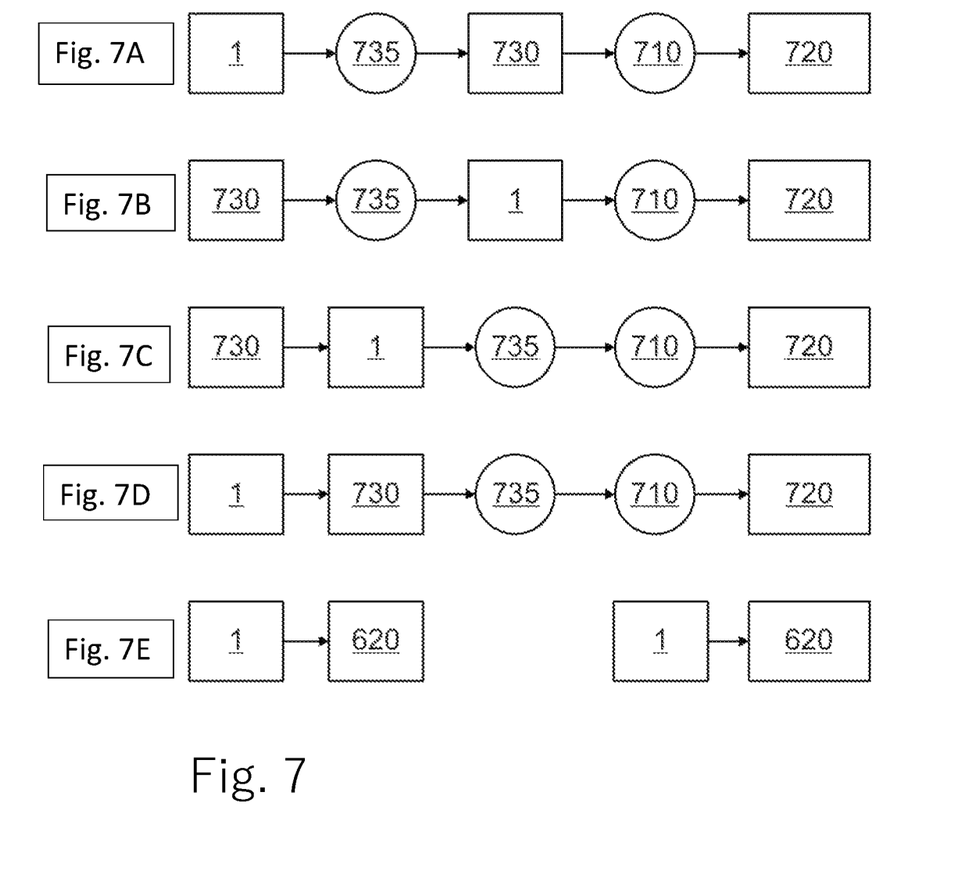
FIGS. 7A-7E show further possible uses of the drive system according to the disclosure in a motor vehicle.

In the example of FIG. 7A, a drive system 1 according to the disclosure is coupled to a further electric machine 730 via a transmission 735 and, together with this, drives wheels 720 via a differential 710.

In the example of FIG. 7B, a further electric machine 730 is coupled to a drive system 1 according to the disclosure via a transmission 735 and, together with this, drives wheels 720 via a differential 710.

In the example of FIG. 7C, a further electric machine 730 is coupled directly to a drive system 1 according to the disclosure and, together with this, drives wheels 720 via a transmission 735 and a differential 710.

In the example of FIG. 7D, a drive system 1 according to the disclosure is coupled directly to a further electric machine 730 and, together with this, drives wheels 720 via a transmission 735 and a differential 710.

In the example of FIG. 7E, two drive systems 1 according to the disclosure are provided, each of which drives a wheel or a wheel group, such as front and rear wheels, 620.

In principle, the transmissions 735 can be implemented in various ways, for example using spur gears, planetary gears or belt gears; manual transmissions are also possible.

Figure 8:
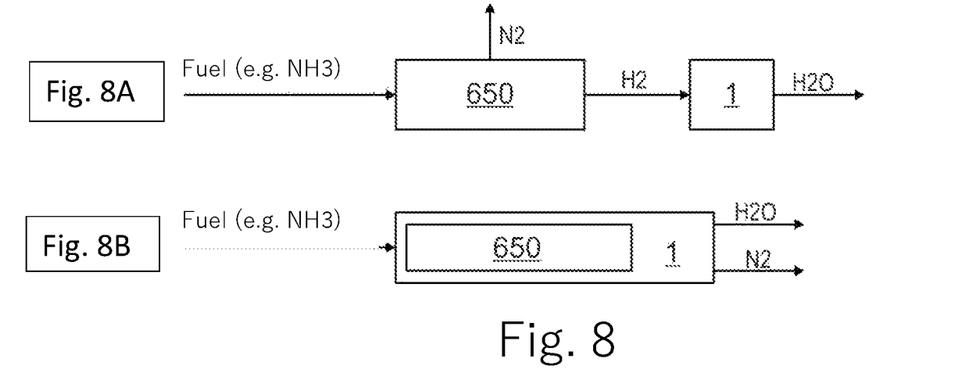
FIGS. 8A-8B show the use of a reformer in connection with a drive system according to the disclosure.

FIGS. 8A and 8B show two options for using a reformer 650 in conjunction with a drive system 1 according to the disclosure. In the example of FIG. 8A, the reformer 650 is a separate device, separate from the drive system 1. Fuel, in this case ammonia, is supplied to the reformer 650. In the reformer 650, ammonia is split into nitrogen and hydrogen, the nitrogen is released into the environment, and the hydrogen is supplied to the fuel cell of the drive system 1 according to the disclosure. The water produced in the fuel cell is discharged from the drive system 1.

In the example of FIG. 8B, the reformer 650 is integrated into the drive system 1 according to the disclosure, so that the reformer 650 and drive system 1 form a module that can also be installed as a whole in a motor vehicle. The module is supplied with fuel, in this case ammonia, which is split into hydrogen and nitrogen in the reformer 650. The hydrogen is converted into water in the fuel cell of the drive system 1. This water is drained from the module together with the nitrogen.

LIST OF REFERENCE SIGNS

1 Drive system
2 Unipolar machine
3 Fuel cell
4 Rotor
5 Rotor shaft
6 Magnet
7 Brush
31 Electrode
32 Electrode
33 Channel
34 Channel
35 Area
36 Area
41 Outer edge (rotor)
51 Bearing
52 Rotary feedthrough
53 Channel
61 Winding
100 Fuel supply
101 Fuel supply
310 Fuel cell
311 Fuel cell element
320 Energy storage device
330 Power electronics
340 Electric motor
500 Magnetic field
550 Current flow
600 Motor vehicle
610 Differential
615 Transmission
620 Wheel or wheel group
630 Electric machine
633 Battery
635 Transmission
640 Ammonia storage
650 Reformer
660 Control system
670 Assembly
710 Differential
720 Wheels
730 Electric machine
735 Transmission

The invention claimed is:

1. A drive system, comprising:
a fuel cell including a first electrode and a second electrode; and
a unipolar machine, the fuel cell being configured to supply the unipolar machine with electrical energy, the unipolar machine includes a rotor and a rotor shaft, and the fuel cell surrounds the rotor shaft of the rotor in a ring shape;
wherein:
the first electrode of the fuel cell is non-rotatably connected to the rotor, and the first electrode receives a first fuel supply via a rotary feedthrough and a channel to the rotor shaft and the rotor; and
the second electrode of the fuel cell is connected to a stationary component of the drive system, and the second electrode receives a second fuel supply via a channel extending through the stationary component.

2. The drive system according to claim 1, wherein the first electrode of the fuel cell is electrically conductively connected to the rotor by a brush and the second electrode of the fuel cell is electrically connected to the rotor shaft via another brush.

3. The drive system according to claim 1, further comprising a reformer integrated into the drive system.

4. The drive system according to claim 1, wherein the unipolar machine comprises an electromagnet.

5. A motor vehicle, comprising a drive system according to claim 1, wherein the unipolar machine is configured to supply a traction torque for the motor vehicle.

6. The motor vehicle according to claim 5, further comprising a further electric machine, and the unipolar machine drives the further electric machine.

7. The motor vehicle according to claim 5, wherein the motor vehicle has at least two of the drive systems according to claim 1 and each of the drive systems is configured to drive a wheel or a wheel group of the motor vehicle.

8. A drive system, comprising:
a unipolar machine having at least one magnet, a rotor, and a shaft;
a fuel cell configured to supply energy to the unipolar machine, the shaft including a channel for feeding fuel to an electrode of the fuel cell mounted on the rotor, wherein the at least one magnet comprises a plurality of magnets and the electrode is positioned fully radially outward of each of the plurality of magnets.

9. The drive system of claim 8, wherein the fuel cell surrounds the rotor.

10. The drive system of claim 8, further comprising a rotary feedthrough for feeding the fuel to the channel in the shaft.

11. The drive system of claim 8, further comprising one electrode of the fuel cell being electrically conductively connected to the rotor by a brush and another electrode of the fuel cell being electrically connected to the rotor shaft via another brush.

12. The drive system of claim 8, further comprising a reformer configured to generate hydrogen.

13. A motor vehicle, comprising a drive system according to claim 8, wherein the unipolar machine is configured to supply a traction torque for the motor vehicle.

* * * * *